(12) United States Patent
Kawai et al.

(10) Patent No.: US 10,078,324 B2
(45) Date of Patent: Sep. 18, 2018

(54) TOOL MANAGEMENT SYSTEM

(71) Applicant: MAKINO MILLING MACHINE CO., LTD., Tokyo (JP)

(72) Inventors: Rie Kawai, Aiko-gun (JP); Hideki Heishi, Aiko-gun (JP); Toshimasa Uetama, Aiko-gun (JP); Kenichi Ono, Aiko-gun (JP)

(73) Assignee: MAKINO MILLING MACHINE CO., LTD., Tokyo (JP)

( * ) Notice: Subject to any disclaimer, the term of this patent is extended or adjusted under 35 U.S.C. 154(b) by 302 days.

(21) Appl. No.: 14/915,038

(22) PCT Filed: Aug. 30, 2013

(86) PCT No.: PCT/JP2013/073394
§ 371 (c)(1),
(2) Date: Feb. 26, 2016

(87) PCT Pub. No.: WO2015/029232
PCT Pub. Date: Mar. 5, 2015

(65) Prior Publication Data
US 2016/0202690 A1     Jul. 14, 2016

(51) Int. Cl.
*G06F 19/00*     (2018.01)
*G05B 19/4093*     (2006.01)

(52) U.S. Cl.
CPC ............... *G05B 19/40938* (2013.01); *G05B 2219/32422* (2013.01); *Y02P 90/205* (2015.11); *Y02P 90/265* (2015.11)

(58) Field of Classification Search
CPC .............................................. G05B 19/40938
USPC ........................................................ 700/169
See application file for complete search history.

(56) References Cited

U.S. PATENT DOCUMENTS 7,363,103 B2 * 4/2008 Takahashi ........ G05B 19/40937
                                                                700/173
2008/0033592 A1   2/2008 Okrongli et al.

FOREIGN PATENT DOCUMENTS

| JP | 4-87759 | 3/1992 |
|---|---|---|
| JP | 4-153707 | 5/1992 |
| JP | 5-274023 | 10/1993 |
| JP | 6-31599 | 2/1994 |
| JP | 6-297280 | 10/1994 |
| JP | 2002-196809 | 7/2002 |
| JP | 2002-283191 | 10/2002 |
| JP | 2002-304208 | 10/2002 |
| JP | 2004-142025 | 5/2004 |
| JP | 2007-125642 | 5/2007 |

(Continued)

OTHER PUBLICATIONS

International Search report dated Dec. 10, 2013, directed to International Application No. PCT/JP2013/073394; 2 pages.

*Primary Examiner* — Hoai V Ho
(74) *Attorney, Agent, or Firm* — Morrison & Foerster LLP

(57) ABSTRACT

A tool management system is equipped with: a tool management device that includes a tool searching unit; a tool database that includes a list of all of the tools that are set up in a factory; a list of tools to be used that is a list of tools that is necessary for the execution of an NC program; and a candidate tool list wherein candidate tools that can be tools to be used are extracted from the list of tools to be used and the tool database. The candidate tool list is displayed on a display unit of the tool management device.

8 Claims, 5 Drawing Sheets

(56) References Cited

FOREIGN PATENT DOCUMENTS

| | | |
|---|---|---|
| JP | 2007-323447 | 12/2007 |
| JP | 2007-326174 | 12/2007 |

* cited by examiner

FIG. 2

| TOOL DATA | | | | | | |
|---|---|---|---|---|---|---|
| PROGRAM NUMBER | | | | | | |
| ⊞ O100 | | | | | | |
| ⊞ O200 | | | | | | |
| ⊟ O300 | | | | | | |
| TOOL NUMBER (PTN) | POT | TOOL TYPE | TOOL DIAMETER | TOOL LENGTH | NUMBER OF CUTTING EDGE | NOTE |
| 71 | NON | FLAT END MILL | 16.0000 | 180.0000 | 2 | |
| 31 | NON | DRILL | 8.0000 | 155.0000 | – | |
| 28 | NON | TAP | M5 | 130.0 | – | |
| ⊞ O400 | | | | | | |

FIG. 3

| TOOL DATA | | | | |
|---|---|---|---|---|
| IN MAGAZINE | | | | |
| POT NUMBER | TOOL NUMBER (PTN) | TOOL TYPE | TOOL LENGTH DATA | TOOL DIAMETER DATA |
| TOOL ON SPINDLE (2) | 2 | FLAT END MILL | 100.0000 | 10.0000 |
| NEXT TOOL (11) | 11 | DRILL | 60.0000 | 4.0000 |
| 1 | 1 | BALL END MILL | 120.0000 | 8.0000 |
| 2 | 2 | FLAT END MILL | 100.0000 | 10.0000 |
| 3 | 3 | BALL END MILL | 120.0000 | 10.0000 |
| 4 | 4 | FACE MILL | 150.0000 | 100.0000 |
| 5 | 5 | FACE MILL | 155.0000 | 150.0000 |
| 6 | 6 | DRILL | 90.0000 | 2.0000 |
| 7 | 7 | DRILL | 88.0000 | 3.0000 |
| 8 | 8 | BALL END MILL | 160.0000 | 12.0000 |
| ... | ... | ... | ... | ... |

FIG. 4

| TOOL DATA | | | | | |
|---|---|---|---|---|---|
| PROGRAM NUMBER | | | | | |
| ⊞ O100 | | | | | |
| ⊞ O200 | | | | | |
| ⊟ O300 | | | | | |
| TOOL NUMBER (PTN) | POT | TOOL TYPE | TOOL DIAMETER | TOOL LENGTH | NUMBER OF CUTTING EDGE | NOTE |
| 71 | 71 | FLAT END MILL | 16.0000 | 180.0000 | 2 | |
| 31 | NON | DRILL | 8.0000 | 155.0000 | — | |
| 28 | 23 (*) | TAP | M5 | 130.0 | — | |
| ⊞ O400 | | | | | |

FIG. 5

TOOL DATA

PROGRAM NUMBER

⊞ O100
⊞ O200
⊟ O300

| TOOL NUMBER (PTN) | POT | TOOL TYPE | TOOL DIAMETER | TOOL LENGTH | NUMBER OF CUTTING EDGE | NOTE |
|---|---|---|---|---|---|---|
| | | FLAT END MILL | 16.0000 | 180.0000 | 2 | |
| | 71 | DRILL | 8.0000 | 155.0000 | — | |

CANDIDATE SEARCH                                                                                  ✕

| POT | TOOL TYPE | TOOL DIAMETER | TOOL LENGTH | NUMBER OF CUTTING EDGE | NOTE |
|---|---|---|---|---|---|
| 45 | FLAT END MILL | 16.0 | 185.0 | 2 | |
| 30 (*) | FLAT END MILL | 17.0 | 155.0 | 2 | |
| 21 | FLAT END MILL | 15.0 | 130.0 | 2 | |

⊞ O400

TOOL MANAGEMENT SYSTEM

CROSS-REFERENCE TO RELATED APPLICATIONS

This application is a U.S. National Phase patent application of International Patent Application No. PCT/JP2013/073394, filed on Aug. 30, 2013, which is hereby incorporated by reference in the present disclosure in its entirety.

FIELD OF THE INVENTION

The invention relates to a tool management system which assists an operator to carry out a tool preparation work, preparing a plurality of tools, necessary to execute a NC program by a machine tool to process a workpiece, in a tool magazine of the machine tool.

BACKGROUND OF THE INVENTION

In a factory having a plurality of machine tools, such as machining centers, each provided with an automatic tool changer and an NC device, a plurality of tools are typically stored in a toolroom as well as in the tool magazines of the respective machine tools. For example, JP-A-2007-125642, also filed by the applicant of the present application, describes a tool changer for changing tools automatically between a spindle of a machine tool and a tool magazine storing a plurality of tools. The JP publication is incorporated by reference. In order manage such a plurality of tools, a tool number is allocated to each of the tools prepared in a factory. A database stores tool data, such as the types, the lengths and the diameters of tools by associating them with the tool numbers.

Machine tools, such as machining centers, are controlled in accordance with an NC program which describes machining processes. A tool, necessary for a machining process described in a machining program, is selected by a tool magazine and supplied to the machine tool by an automatic tool changer. Therefore, a tool magazine must store all of the tools necessary to execute an NC program. In a tool magazine, each of the tools is fitted with a tool pot having a unique number allocated thereto. A tool magazine has a tool magazine database storing the data, relative to all of the tools in the tool magazine, by associating with the tool pot numbers.

A CAM operator creates an NC program by using a CAM system, based on CAD data creased by a designer of a workpiece, for producing the workpiece. The tools (necessary tool), necessary to execute the respective machining processes described in the NC program, are indicated in the NC program by using the tool numbers. JP-A-2004-142025, also filed by the applicant of the present application, shows an example of an NC program describing such tool numbers. This JP publication is incorporated by reference. When an NC program is changed, the operator of the machine tool must replace the tools in the tool magazine as per the changed NC program. This work is manually carried out by the operator. The operator of the machine tool prepares tools, necessary to execute the respective machining processes, in the tool magazine with reference to the tool numbers in the NC program. The operator fits the tools in tool pots having appropriate pot numbers, and revises the tool magazine data base so that both the tool numbers in the NC program and the pot numbers in the tool magazine database referring to the same tools.

For example, JP-A-H05-274023 describes a CNC device which is provided with a tool data table, storing tool data relative to the respective tools stored in a tool magazine, analyzes a machining program, and determines whether or not the tool data table stores tool data relative to a tool designated in the machining program, whereby if not, failure of tool is judged. The CNC device described in JP-A-H05-274023 allows an operator of a machine tool to easily determine whether or not the tool magazine stores the tools necessary to execute an NC program. However, there is a problem that according to the CNC device of JP-A-H05-274023, while it is possible to determine whether or not the necessary tool is stored in a tool magazine, it is not possible to determine as to which tool pot the tool is fitted in the tool magazine. Further, when a necessary tool is not stored in the tool magazine, it is difficult to find the tool in a storage facility, such as a toolroom.

PATENT LITERATURES

Patent Literature 1: JP-A-2007-125642
Patent Literature 2: JP-A-2004-142025
Patent Literature 3: JP-A-H05-274023

SUMMARY OF THE INVENTION

The invention is directed to solve the problems of the prior art, and the objective of the invention is to provide a tool management system for creating a necessary tool list indicating tools necessary to execute an NC program, a waiting tool list indicating tools stored in a toolroom and a tool magazine, and data relative to the tools such as a tool database, and assists an operator to carry out a tool preparation work, preparing the necessary tools in the tool magazine.

The invention provides a tool management system for a machine tool provided with a tool magazine, comprising a tool database including a lies of tools prepared in a factory, a necessary tool list indicating tools necessary to execute an NC program, and a candidate tool list indicating candidate tools which are possible to be the necessary tools and extracted the necessary tool list and the tool database, wherein the candidate tool list is displayed in the displaying section.

A candidate tool list is displayed in the displaying section, when a necessary tool is not indicated in the tool database, an operator of the machine tool can easily select a substitutable tool with reference to the candidate tool list. By sharing the tool database, available to an operator of the machine tool, between the computers of an NC device and a CAM system, the necessary tool list, the waiting tool list and the candidate tool list can be quickly created.

BRIEF DESCRIPTION OF THE DRAWINGS

FIG. 2 is an example of a necessary tool list displayed in a displaying section.
FIG. 3 is an example of a waiting tool list displayed in a displaying section.
FIG. 4 is an example of a matching table displayed in a displaying section.
FIG. 5 is an example of a candidate tool list displayed in a displaying section.

Figure 1:
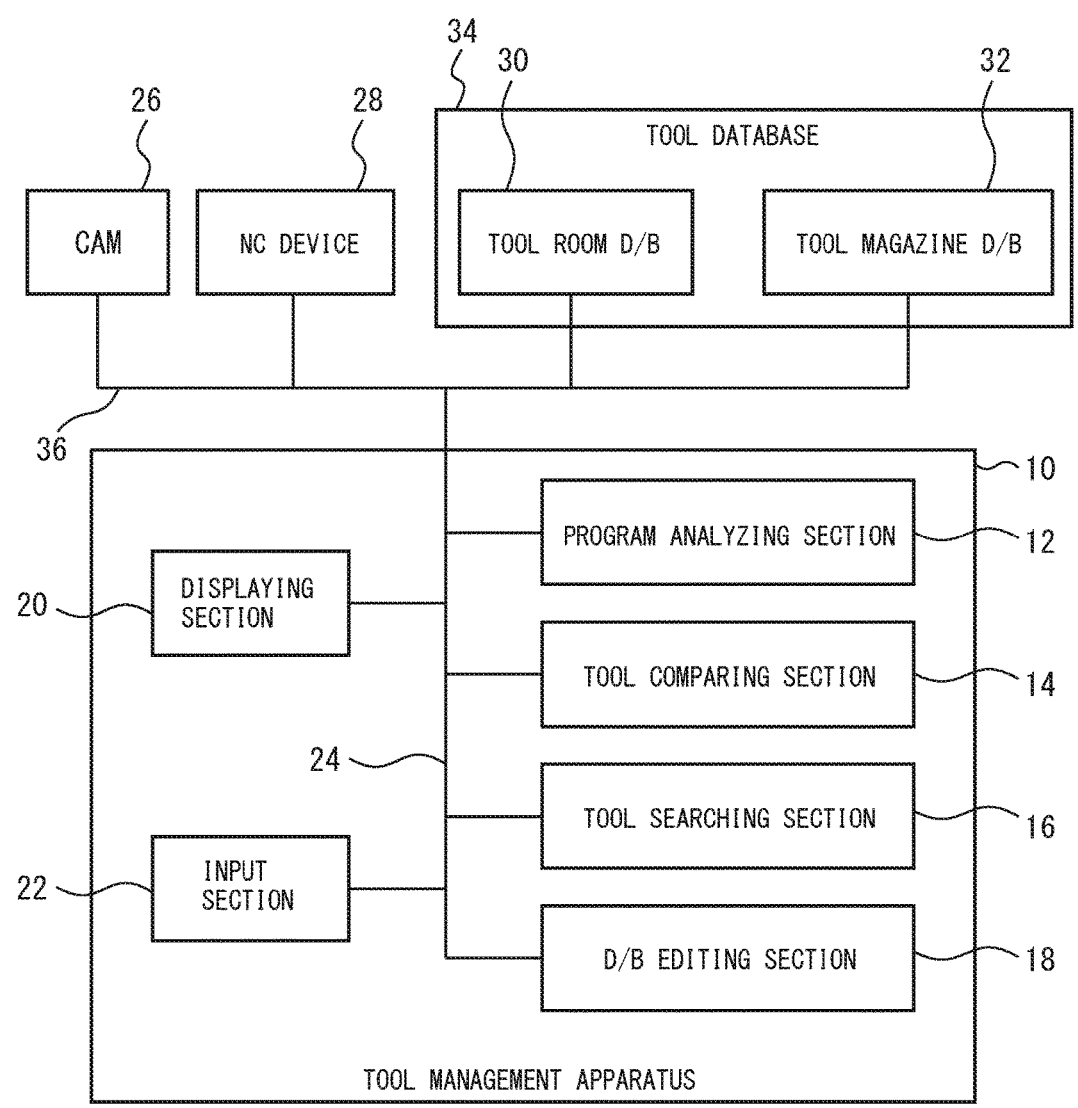
FIG. 1 is a block diagram of a tool management system according to a preferred embodiment of the invention.

With reference to the drawings, a preferred embodiment of the invention will be described below.

FIG. 1 is a block diagram showing a tool management system according to a preferred embodiment of the invention. In FIG. 1, a tool management apparatus 10 comprises a program analyzing section 12, a tool comparing section 14, a tool searching section 16, a database editing section 18, a display section 20, such as a liquefied crystal display device or a touch panel, and an input section 22, such as a key board or a touch panel forming the display section 20, which are interconnected by a bidirectional bus 24. Further, the tool management apparatus 10 is connected to a CAM system 26, an NC device 28, a toolroom database 30 and a tool magazine database 32 by a communication means 36, such as a LAN.

The tool management apparatus 10 may be composed of a part of a program incorporated in a machine controller (not shown) for controlling a machine tool or the NC device 28. Alternatively, the tool management apparatus 10 may be a separate computer disposed near the machine tool. Further, in this embodiment a tool database 34 is formed by the toolroom database 30 and the tool magazine database 32. When a factory has a plurality of machine tools, the tool database 34 may include the tool magazine databases of the other machine tools.

As described below, the program analyzing section 12 accesses the CAM system 26 to analyze an NC program created by the CAM system 26 so that tools to be used to execute all of the machining processes described in the NC program whereby a necessary tool list is created. The tool comparing section 14 collates the necessary tool list created by the program analyzing section 12 and a waiting tool list contained in the tool magazine database 32.

As described below, when the tools described in the necessary tool list and the tools described in the waiting tool list do not coincide with each other, the tool searching section 16 searches the tool database 34 for a tool conforming to search conditions, and creates a candidate tool list based on the search results. The database editing section 18 accesses the tool database 34, allowing the operator of the machine tool to revise the tool database 34.

In a machine tool, for example a machining center, provided with the NC device 28, the NC device 28 reads an NC program from the CAM system 26 and interprets it whereby a workpiece is machined in accordance with the NC program. A CAM operator, creating an NC program, uses the CAM system 26 to create, based on CAD data, i.e., the design data, the NC program necessary to machine a workpiece by the machine tool. When creating an NC program, CAM operators typically select tools with reference to a tool list shown in Table 1. The tool list shown in Table 1 describes, in relation to all of the tools in a factory, tool data such as the types of the tools (such as a square end mill, a ball end mill and a drill), the size of the tool (such as tool length and tool diameter) and the number of the cutting edges, in the form of a table, incorporated with the tool numbers (PTN). The NC programmer selects tools suitable for executing the respective machining processes and describes the tool numbers, corresponding to the tools, in the NC program. When executing the respective machining processes in an NC program, the machine tool commands the tool magazine and the automatic tool changer to attach a tool to the end of the spindle, corresponding to the tool number, by referring to the tool number in the NC program.

TABLE 1

| PTN | Tool Type | Number of Cutting Edges | Tool Length (Acceptable Value) | Tool Diameter (Acceptable Value) |
|---|---|---|---|---|
| 1 | Ball End Mill | 2 | 120.0000 | 8.0000 |
| 2 | Flat End Mill | 4 | 11.0000 | 10.0000 |
| 3 | Ball End Mill | 2 | 120.0000 | 10.0000 |
| . | . | . | . | . |
| . | . | . | . | . |
| . | . | . | . | . |

Toolroom database 30 contains, in relation to all of the tools, presently stored in a toolroom for keeping tools, data such as the types (such as a square end mill, a ball end mill and a drill), the sizes (such as tool length and tool diameter) and the numbers of the cutting edges of the tools, by associating with the tool numbers and the numbers of tool pots (Pot Number), to which the tools are fitted. In this connection, while the pot numbers and the tool numbers coincide with each other in FIG. 2, they are not necessary to coincide with each other.

TABLE 2

| Pot Number | PTN | Tool Type | Number of Cutting Edges | Tool Length (Acceptable Value) | Tool Diameter (Acceptable Value) |
|---|---|---|---|---|---|
| 1 | 1 | Ball End Mill | 2 | 120.0000 | 8.0000 |
| 2 | 2 | Flat End Mill | 4 | 11.0000 | 10.0000 |
| 3 | 3 | Ball End Mill | 2 | 120.0000 | 10.0000 |
| . | . | . | . | . | . |
| . | . | . | . | . | . |
| . | . | . | . | . | . |

As shown in Table 3, the tool magazine database 32 contains, in relation to all of the tools, presently stored in the tool magazine of a machine tool, to which the tool management system of the invention is applied, data such as the types (such as a square end mill, a ball end mill and a drill), the sizes (such as tool length and tool diameter) and the numbers of the cutting edges of the tools, by associating with the numbers of tool pots (Pot Number), to which the tools are fitted in the tool magazine.

TABLE 3

| Pot Number | PTN | Tool Type | Number of Cutting Edges | Tool Length (Acceptable Value) | Tool Diameter (Acceptable Value) |
|---|---|---|---|---|---|
| 1 | 1 | Ball End Mill | 2 | 120.0000 | 8.0000 |
| 2 | 2 | Flat End Mill | 4 | 11.0000 | 10.0000 |
| 3 | 3 | Ball End Mill | 2 | 120.0000 | 10.0000 |
| . | . | . | . | . | . |
| . | . | . | . | . | . |
| . | . | . | . | . | . |

The program analyzing section 12 receives an NC program from the CAM system 26 and analyzes the NC program to extract the tool numbers necessary to execute the respective machining processes of the NC program whereby a necessary tool list is created by associating the information, such as types, the diameters and the lengths of the respective tools with the tool numbers and the pot numbers of the tool pots to which the tools are fitted in the tool magazine. FIG. 2 shows an example of the necessary tool list, which is displayed in the displaying section 20. The displaying section 20 displays the program numbers (0001, 0002, . . . ) in the screen thereof, and that the number of the tools to be used for executing the NC program is three, when one of the program numbers, for example, program number 0003 is clicked, along with the tool numbers (PNT), the types of the tools, the tool diameters, the tool lengths, the number of cutting edges, and etc., in the form of a list.

The tool comparing section 14 creates the waiting tool list based on the tool data contained in the toolroom database 30 and the tool magazine database 32. With reference to FIG. 3, an example of the waiting tool list to be displayed in the displaying section is shown. The tool comparing section 14 compares the waiting tool list with the necessary tool list created by the program analyzing section 12 to display the comparing results in the displaying section in the form of a matching table, shown in FIG. 4. An operator of the machine tool can judge whether or not the tools necessary to machine are stored in the tool magazine by referring to the matching table displayed in the displaying section 20.

With reference to the matching table shown in FIG. 4, while the necessary tool, indicated by PNT=71, is a flat end mill having a tool diameter of 16.0000 mm, a tool length of 180.0000 mm and two cutting edges, the tool indicated by the pot number of 71 in the tool magazine is a drill having a tool diameter of 8.0000 mm and a tool length of 155.0000 mm. Accordingly, when the operator refers to the matching table displayed in the displaying section 20, if the tool of a tool number is different from the tool of a pot number the same as the tool number, the operator may activate the tool searching section 16 to extract a flat end mill the same as the flat end mill of PTN=71 or a tools substitutable for the flat end mill of PTN=71 as a candidate tool.

With reference to FIG. 5, an example of the candidate tool list to be displayed in the displaying section 20 as the search results conducted by the tool searching section 16 is shown. The candidate tool list, shown in FIG. 5, indicates, as tools substitutable for the necessary tool of PTN=71 (a flat end mill having a tool diameter of 16.000 mm and a tool length of 180.000 mm), a flat end mill of pot number 45, which is stored in the tool magazine and has a tool diameter of 16.0 mm and a tool length of 185.0 mm, a flat end mill of pot number 30, which is disposed outside the tool magazine, for example in a toolroom and has a tool diameter of 17.0 mm and a tool length of 130.0 mm, and a flat end mill of pot number 21, which is stored in the tool magazine and has a tool diameter of 15.0 mm and a tool length of 155.0 mm. In this connection, the sign (*) in the candidate tool list of FIG. 4 indicates that the tool in question is stored outside the tool magazine, i.e., in the toolroom in this embodiment.

When the tool searching section 16 is activated by an operator of the machine tool, the tool searching section 16 displays in the displaying section 20 a dialog allowing the operator to input search conditions. By inputting search conditions, such as the tool type, the range of tool diameter, the range of tool length and the number of cutting edge, tools conforming to the search conditions are found. For example, by inputting only the type of tool, tools, belonging to the tool type and having a variety of tool diameters, tool lengths and numbers of cutting edge, are displayed. Then, in order to narrow the search results, the range of tool diameter may be input, and the search is conducted again. In order to further narrow the results, the range of tool diameter may be reduced or the range of tool length may be input, and the search is conducted again. In order to further narrow the results, the range tool length may be reduce or the number of cutting edge is input, and the search is conducted again. Accordingly, the search results can be narrowed. The order of displaying the search results, i.e., the order of the recommended tools is that the tools, which are the same type and have less differences (absolute value) in the tool diameter, override the tools having less differences (absolute value) in the tool length, overriding the tools having the same number of the cutting edge(s). When activated, the tool searching section 16 may automatically conduct a search of tools which were used in the similar machining process so that the search results thereof are displayed.

The operator of the machine tool can advantageously select a substitutable tool based on the search results. As an example, when an operator of the machine tool selects a pot number 45 or 21 end mill stored in the tool magazine as a PTN=71 tool, the operator manually remove the end mill from the No. 45 or No. 21 tool pot and fits the No. 71 tool thereto, and rewrites the tool data contained in the tool magazine database 32 relative to pot number 71 to a flat end mill having a tool diameter of 16.0 mm and a tool length of 185.0 mm, via the input section 22 and the database editing section 18 of the tool management apparatus 10. Alternatively, the PTN, i.e., the tool number for calling a tool, may be rewrote so that the PTN for pot number 71 is rewrote to another number, and the PNT for pot number 45 may be rewrote to 71. When an operator selects a pot number 30 flat end mill stored outside the tool magazine, for example in a toolroom, the operator takes the pot number 30 flat end mill from the toolroom and fits the flat end mill to No. 71 tool pot in the tool magazine. The operator further rewrites the tool data contained in the tool magazine database 32 relative to pot number 71 to a flat end mill having a tool diameter of 16.0 mm and a tool length of 185.0 mm, via the input section 22 and the database editing section 18 of the tool management apparatus 10, and rewrites the tool data contained in the toolroom database 30 relative to pot number 30.

According to the present embodiment, the CAM system 26 and the tool management apparatus 10 share the tool database 34, including the toolroom database 30 and the tool magazine database 32, enabling the necessary tool list, the waiting tool list and the candidate tool list to be created quickly, and further enabling the tools, necessary to execute an NC program, to be prepared quickly in the tool magazine.

When searching a substitutable tool for a necessary tool, due to inconsistency between the tools in the necessary tool list and the waiting tool list, the tool searching section 16 may automatically set search conditions, based on past record data relative to a past similar process. This enables the tools, necessary to execute an NC program, to be prepared in the tool magazine more quickly and easily. Further, the accuracy of searching tools can be improved by providing a configuration for compiling past record data and past search conditions.

Further, according the present embodiment, the tool data may be commonly used between different departments, such as a department where programmers create NC programs and a department where operators of machine tools edit the waiting tool lists, enabling necessary tools to be prepared quickly in the tool magazines or the tool database to be easily rewrote.

REFERENCE SIGNS LIST

10 Tool Management Apparatus
12 Program Analyzing Section
14 Tool Comparing Section
16 Tool Searching Section
18 Database Editing Section
20 Displaying Section
22 Input Section
26 CAM system 28 NC Device
30 Toolroom Database
32 Tool Magazine Database
34 Tool Database

The invention claimed is:

1. A tool management system for a machine tool provided with a tool magazine, comprising:
   a tool database including a list of tools prepared in a factory;
   a necessary tool list indicating tools necessary to execute an NC program;
   a tool comparing section creating a waiting tool list based on the tool database, creating a matching table by collating the waiting tool list and the necessary tool list, and displaying the matching table in a displaying section;
   a tool searching section searching the tool database for a tool conforming to search conditions, when the tools on the necessary tool list and the tools on the waiting tool list shown in the matching table do not coincide with each other, creating, based on the search results, a candidate tool list, and displaying the candidate tool list in the displaying section, the candidate tool list indicating candidate tools which are possible to be the necessary tools and extracted from the tool database; and
   a database editing section allowing an operator to revise tool data contained in the tool database via an input section, when the operator selects a substitutable tool from the candidate tool list and replaces a tool contained in a tool magazine or in a toolroom with the selected substitutable tool.

2. The tool management system of claim 1, wherein the tool database includes a toolroom database, containing a list of all of the tools stored in a toolroom for storing tools provided in a factory, and a tool magazine database, containing a list of all of the tools stored in a tool magazine of the machine tool.

3. The tool management system of claim 2, wherein the toolroom database contains at least the types, the tool diameters the tool lengths of the respective tools described in the list by associating with the numbers of tool receivers to which the tools are fitted in the toolroom.

4. The tool management system of claim 2, wherein the tool magazine database contains at least the types, the tool diameters the tool lengths of the respective tools described in the list by associating with the numbers of tool receivers to which the tools are fitted in the tool magazine.

5. The tool management system of claim 2, wherein the tool comparing section creates the waiting tool list indicating the tools stored in the toolroom and the tool magazine, based on the toolroom database and the tool magazine database so as to compare the waiting tool list with the necessary tool list.

6. The tool management system of claim 1, wherein the tool searching section displays in the displaying section a dialog allowing the search conditions to be input.

7. The tool management system of claim 1, wherein the tool searching section displays in the displaying section search conditions based on past record data.

8. The tool management system of claim 1, comprising a program reading section for reading the NC program and analyzing it to create the necessary tool list.

* * * * *